United States Patent [19]

Baranski

[11] Patent Number: 4,681,005

[45] Date of Patent: Jul. 21, 1987

[54] TWIN ARBOR RESAW WITH A FENCE HAVING A CONTINUOUS ROTATABLE BELT

[76] Inventor: Edward J. Baranski, 558 Woodlawn Road East, Guelph, Ontario N1E 1C2, Canada

[21] Appl. No.: 744,335

[22] Filed: Jun. 13, 1985

[30] Foreign Application Priority Data

Jun. 13, 1984 [CA] Canada ................................ 456533

[51] Int. Cl.$^4$ .................... B27B 7/04; B27B 25/02; B27B 27/02
[52] U.S. Cl. .................... 83/404.4; 83/420; 83/422; 83/424; 83/425; 83/425.3; 83/446; 83/449; 83/873; 83/51; 144/378
[58] Field of Search ............... 83/863-865, 83/870-874, 404.4, 407, 419, 420, 425, 422, 424, 446, 449, 732, 51, 425.3, 436; 144/378

[56] References Cited

U.S. PATENT DOCUMENTS

| | | | |
|---|---|---|---|
| 485,970 | 11/1892 | McDonough | 83/422 X |
| 1,584,797 | 5/1926 | Neal | 83/873 |
| 4,210,184 | 7/1980 | McGriff | 83/449 X |
| 4,332,180 | 6/1982 | Johnson | 83/422 X |

*Primary Examiner*—Donald R. Schran
*Attorney, Agent, or Firm*—Daryl W. Schnurr

[57] ABSTRACT

A resaw has twin arbors with one to six blades mounted on each arbor. In addition, the resaw has a rotatable fence with a continuous belt along its periphery. Two side pressure rollers are mounted adjacent to the rotatable fence between an entrance to the resaw and the blades. A workbed of the resaw is made up of a series of spiked rollers. Just prior to an exit from the resaw, there is located a top roller which is mounted normal to the side pressure rollers and can move further away from or closer to the workbed. The arbors are each powered by an electric motor. The rotatable fence, the side pressure rollers and the spiked rollers are all powered by hydraulic motors connected to a single power source and all rotate at the same speed at any given time. The side pressure rollers are automatically adjustable so that they exert pressure towards the rotatable fence on any wood that is located between said rollers and said fence. The side pressure rollers, the rotatable fence and the spiked rollers operate together to force wood from an entrance to said resaw, past said arbors, to an exit. The resaw can be used to process lumber of various widths and heights without stopping the resaw to make adjustments as the lumber changes in size.

27 Claims, 6 Drawing Figures

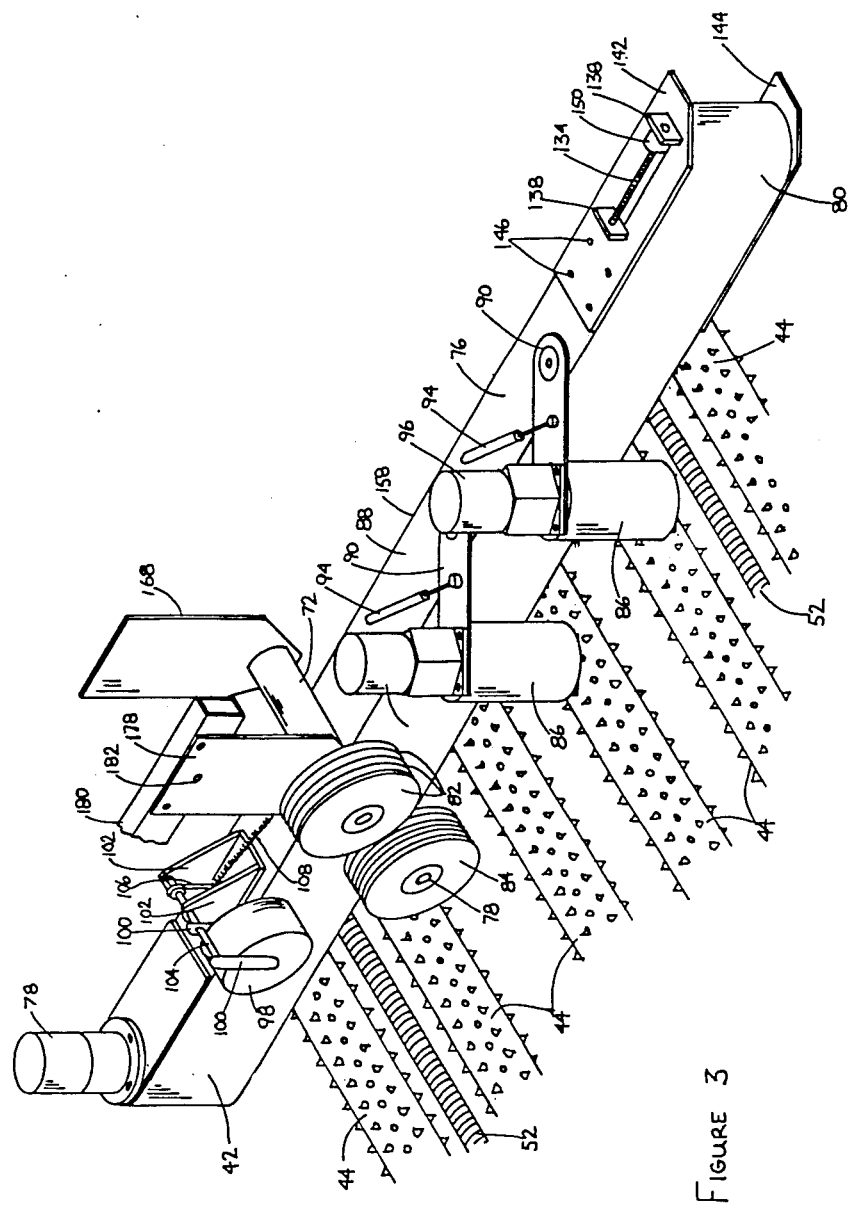

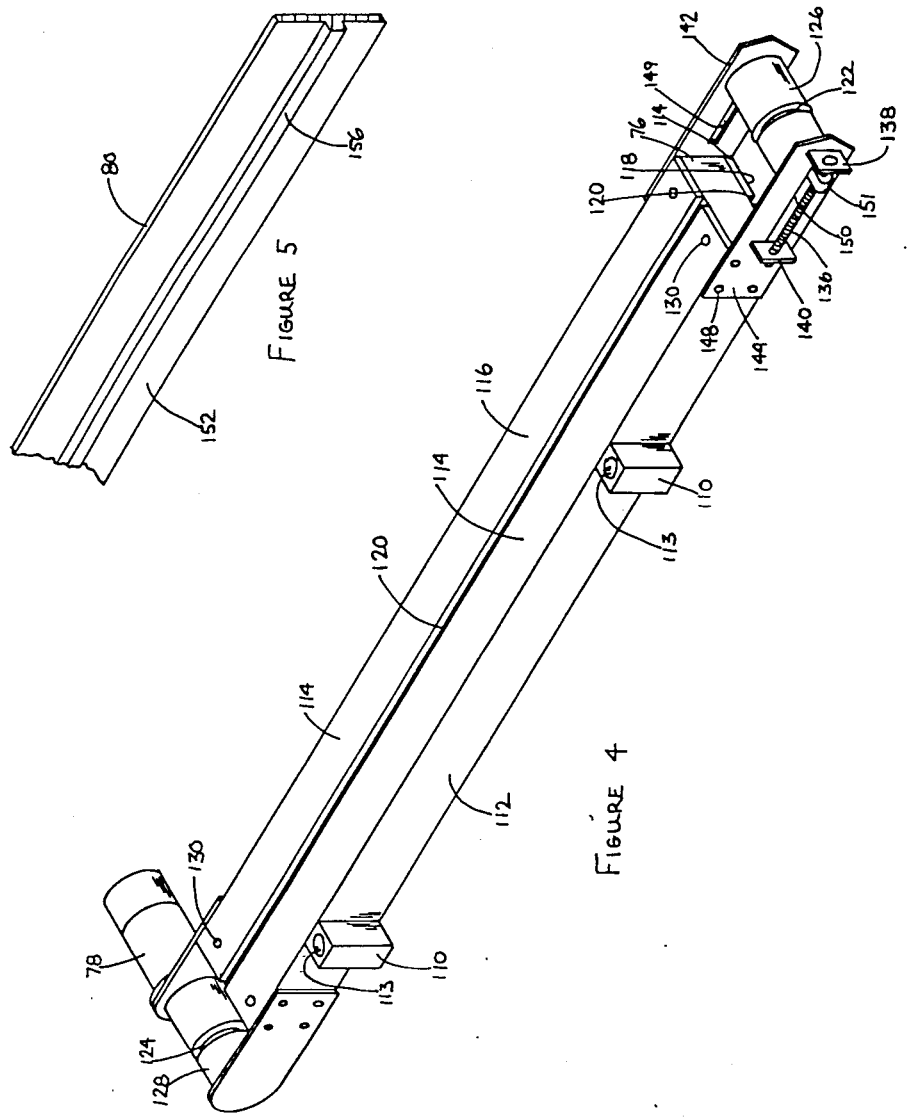

4,681,005

TWIN ARBOR RESAW WITH A FENCE HAVING A CONTINUOUS ROTATABLE BELT

BACKGROUND OF THE INVENTION

1. Field of the Invention

This invention relates to a resaw for splitting wood and, in particular, to a resaw that automatically adjusts itself to wood of various sizes within a predetermined size range.

2. Description of the Prior Art

It is known to have resaws for splitting wood but the resaws are not automatically adjustable for wood of various widths and, with many prior resaws, the saw must be shut down and adjusted when the width of the wood being split changes. This necessitates the sorting of the wood according to size before it is placed into the resaw. Band saws are sometimes used as resaws but band saws have a very expensive blade, they tend to be noisy and often break down. Further, previous resaws are not designed so that the blade or blades can be replaced or changed quickly. In addition, previous resaws do not operate with a narrow kerf thereby wasting more of the wood being split as sawdust.

It is an object of the present invention to provide a resaw for splitting wood, said resaw being automatically adjustable and capable of processing wood of various sizes within a predetermined size range without interrupting the sawing process for changes in the size of the wood.

It is a further object of the invention to provide a resaw for splitting wood, said resaw having a rotatable fence for urging the wood through said resaw.

SUMMARY OF THE INVENTION

In accordance with the present invention, a resaw for splitting wood has a frame with two sides, a front and a rear with an entrance for said wood being located at said front and an exit for said wood being located at said rear. Twin arbors are located between said entrance and said exit, each arbor having at least one blade mounted thereon. One arbor is positioned so that its blade or blades cuts the lower portion of the wood being split. The other arbor is positioned so that its blade or blades cuts the upper portion of the wood being split. Each blade on one arbor has a corresponding blade on the other. The arbors are offset from one another from front to rear so that a cutting area of the two arbors overlaps slightly. A workbed for said wood is located between said entrance and said exit, said workbed being movable to force wood being split towards said exit. A rotatable fence extends along said workbed and slightly beyond said entrance and said exit. The fence has a continuous belt along a side adjacent to said blades, said belt being rotatable in an appropriate direction so that it can force wood being split towards said exit when said resaw is in use. The fence is adjustable towards or away from said arbors. At least two side pressure rollers are mounted in a spaced relationship to said rotatable fence on a side adjacent to said blade. The pressure rollers are automatically adjustable so that they can exert pressure towards said fence on any wood within a predetermined size range, located between said rollers and said fence. The rollers are rotatable in an appropriate direction so that wood being split can be forced towards said exit when the resaw is in use. At least one power source drives the arbors, the rotatable fence and the two side pressure rollers.

Preferably, there is at least one power source to drive the arbors and at least one other power source to drive the rotating fence, the workbed and the two side pressure rollers.

BRIEF DESCRIPTION OF THE DRAWINGS

In the drawings:

FIG. 3 is a partial perspective view of a feeding and cutting mechanism of said resaw;

FIG. 4 is a perspective view of a bottom of a rotatable fence of said resaw with a continuous belt removed;

FIG. 5 is a perspective view of part of an interior surface of said continuous belt;

DESCRIPTION OF A PREFERRED EMBODIMENT

Figure 1:
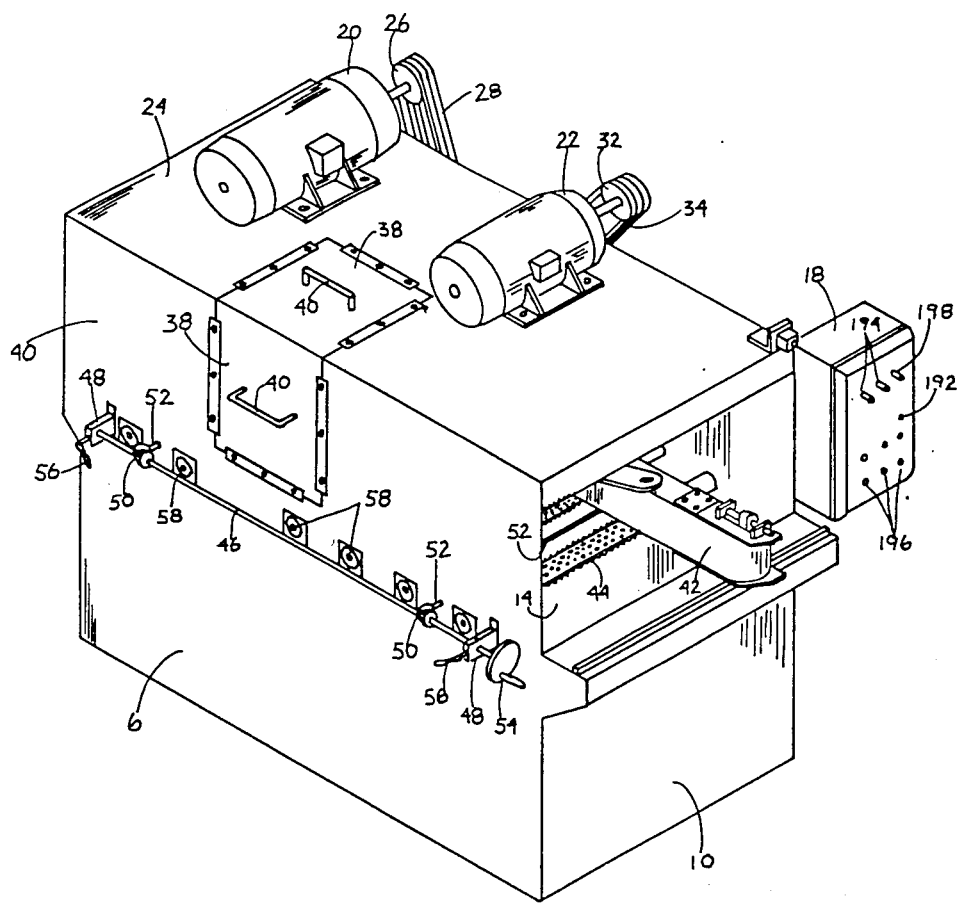
FIG. 1 is a perspective view of a resaw when viewed from a front and one side.
Figure 2:
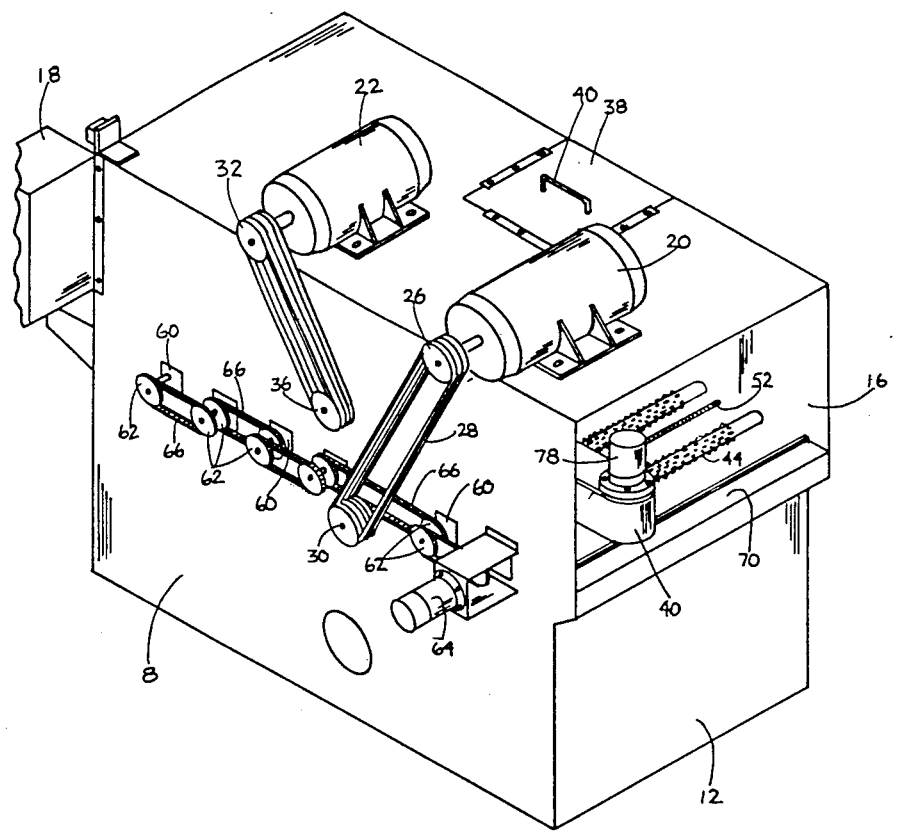
FIG. 2 is a partial perspective view of said resaw when viewed from a rear and the opposite side.

Referring to the drawings in greater detail, in FIGS. 1 and 2, there is shown a resaw 2 which has a housing 4 mounted on a frame (not shown). The housing 4 has sides 6, 8, a front 10 and a rear 12. An entrance 14 is located at said front 10 and an exit 16 is located at said rear 12. A control box 18 is mounted on one side of the housing 4 at a front 10. Electric motors 20, 22 are mounted on a top 24 of the housing 4. The electric motor 20 has a pulley 26 which is connected by belts 28 to a pulley 30 that is connected to a lower rear arbor (not shown). The electric motor 22 has a pulley 32 which is connected by belts 34 to a pulley 36. The pulley 36 is connected to an upper front arbor (not shown). A cover 38 with handles 40 is mounted on a side 6 and top 24 of the housing 4.

Extending from the entrance 14 is a rotatable fence 42. The fence 42 extends from an area of said entrance 14 to an area of said exit 16. Elongated rollers 44 are rotatably mounted from side to side along said housing 4. Preferably, the elongated rollers 44 are either spiked or knirled.

On a side 6 of the housing 4, there is mounted an arm 46 extending along one side of said housing. The arm 46 is rotatably mounted to said housing 4 by brackets 48. The arm 46 is connected by gears 50 to two side arms 52 that are also rotatably mounted on said housing. A handle 54 is located at one end of said arm 46 and can be used to rotate said arm in either direction, as desired. Each of the brackets 48 has locking means 56 contained therein so that the arm 46 can be fixed in one position, when desired. One end of each of the spiked rollers 44 is rotatably mounted in bearings 58, which in turn are mounted in the side 6 of the housing 4. Another end of the spiked rollers 44 is rotatably mounted in bearings 60, which in turn are mounted in side 8 of the housing 4. Connected to an end of each of the spiked rollers 44 at the side 8 of the housing 4 are sprockets 62. The spiked roller 44 nearest the entrance 14 and the spiked roller 44 nearest the exit 16 have one sprocket 62 mounted thereon. The remaining spiked rollers 44 have two sprockets 62, mounted thereon. An hydraulic motor 64 is mounted on the side 8 of said housing adjacent to the sprocket 62 of the spiked roller 44 that is located nearest the exit 16. Link chains 66 connect sprockets of adjacent spiked rollers 44 to one another and they can all be driven in the same direction simultaneously by the hydraulic motor 64.

At the entrance 14, there is located a shelf 68 for supporting the wood being split as it enters the resaw 2. A shelf 70 is located at the exit 16 to support the wood being split as it leaves the resaw 2.

Referring to FIG. 3 in greater detail, there is shown the feeding and cutting mechanism of the resaw 2. In general terms, those parts of the interior of the resaw that are hidden by the upper portion of the housing 4 in FIGS. 1 and 2 are shown in FIG. 3. There are six spiked rollers 44 that are rotatably mounted from side to side along said housing to form a workbed for the wood being split between said entrance 14 and said exit 16. Adjacent rollers are spaced apart from one another from said entrance 14 to said exit 16 with a larger space being located between the two spiked rollers 44 that are adjacent to a front and rear of arbors 72, 74 respectively. The spiked rollers 44 are rotatable in an appropriate direction to force wood being split towards said exit. In other words, when viewed from the side 6 of the resaw 2, the spiked rollers are rotated in a counterclockwise direction when the resaw is operating to split wood.

The rotatable fence 42 extends along the workbed and slightly beyond said entrance 14 and said exit 16. The fence 42 has a stationary part, which is an elongated tube 76 having a rectangular cross-section. The tube 76 extends from an area of said entrance 14 to an area of said exit 16 and there is a roller (not shown) mounted at either end of said tube 76. The roller near the entrance 14 is adjustable longitudinally relative to tube 76. The roller near the exit 16 is connected to an hydraulic motor 78. The rotating fence 42 has a continuous belt 80 mounted on a side adjacent to blades 82, 84 of said arbors 72, 74 respectively. The belt 80 is rotatable in an appropriate direction so that it can force wood being split towards the exit 16 when the resaw 2 is in use.

Two side pressure rollers 86 are mounted in a spaced relationship to the rotatable fence 42 on a side adjacent to said blades 82, 84. The pressure rollers 86 are mounted so that when the location of said fence 42 is adjusted relative to said arbors 72, 74, the location, at rest, of said pressure rollers 86 in relation to said fence 42 remains constant. The pressure rollers 86 are automatically adjustable so that they can exert pressure towards said fence 42 on any wood, within the predetermined size range, located between said rollers 86 and said fence 42. The rollers 86 are rotatable in an appropriate direction so that wood being split can be forced towards said exit 16 when the resaw is in use. The side pressure rollers 86 are each mounted to an upper surface 88 of said tube 76 by means of swingable arms 90 that are pivoted about points 92 (only one of which is shown). Each side pressure roller is wingable about said pivot points 92 and has means forcing each roller 86 towards, but not in contact with said fence 42. The means for forcing each side pressure roller 86 towards said fence 42 is an air cylinder 94 mounted between a swingable portion of said arm 90 and an upper surface 88 of said tube 76. Each air cylinder 94 allows the arm 90 to which it is connected to pivot relative to said rotatable fence while exerting pressure on said arm 90 to force said roller 86 towards, but not in contact with, said fence 42. There is an hydraulic motor 96 mounted on each roller 86 to drive said roller in an appropriate direction.

Near the exit 16, also mounted on a top surface 18 of said tube 76 is a top roller 98 that is rotatable in either direction and is positioned normal to said side pressure rollers 86. The top roller 98 is movable either towards or further from said workbed with means to force said top roller 98 towards but not in contact with said workbed. The top roller 98 has two straps 100 extending from its centre axis (not shown) that are pivotally connected to a triangular bracket 102 by means of a rod 104. The bracket 102 is affixed to an upper surface 88 of said tube 76. The top roller 98 is rotatable about said rod 104 so that it can move towards or further from said workbed. A pin 106 extends radially from said rod 104. A spring 108 extends between said upper surface 88 and a free end of said pin 106, said spring 108 exerting a pressure on said top roller 98 towards said workbed. The top roller 98 is not powered by any motor but rotates in either direction when an appropriate force is applied to it.

Referring to FIG. 4 in greater detail, there is shown the rotatable fence 42 with the continuous belt 80 removed and with the side pressure rollers 86 and the top roller 98 omitted for purposes of illustration. Brackets 110 are rigidly affixed to an underside 112 of said tube 76 of said fence 42. Each bracket 110 has a threaded opening 113 for receiving a threaded end of one side arm 52 (not shown in FIG. 4).

There are two wear strips 114 affixed to each side 116, 118 of said tube 76. Each pair of wear strips 114 on either side 116, 118 of said tube 76 defines a U-shaped channel 120 near a centre line of said tube 76. The channels extend along each side 116, 118 of said tube from front to rear. A channel 112, 124 of similar shape is located in a circumference of each of a front roller 126 and a rear roller 128 respectively. The channels 122, 124 are aligned with the channel 120. The rollers 126, 128 are each rotatable about their centre axes (not shown). The wear strips 114 are affixed to the tube 76 by bolts 130.

The rear roller 128 is powered by an hydraulic motor 78 while the front roller 126 turns freely. From FIGS. 3 and 4, it can be seen that the front roller 126 is adjustable towards the front or rear by means of threaded bolts 134, 136. The bolts 134, 136 are threaded into suitable openings (not shown) in brackets 138, 140 which are rigidly affixed to plates 142, 144 on top and below said fence 42. The plates 142, 144 are affixed to said tube 76 by screws 146, 148 and have slots 149, 150 respectively. The bolts 134, 136 extend through suitable threaded openings in either end of a shaft 151 extending through the slots 149, 150 of said front roller 126. When the bolts 134, 136 are turned in an appropriate direction, the front roller 126 can be moved either forward or rearward relative to said tube 76.

Referring to FIG. 5 in greater detail, there is shown a partial perspective view of an interior surface 152 of said continuous belt 80. It can be seen that the interior surface 152 has a ridge 156 extending along its interior surface 152. The ridge 156 corresponds in size, shape and location to said channels 120, 122 and 124. Since the channels 120, 122, 124 are centrally located, the ridge 156 is also centrally located on said belt. The ridge 156 extends along the entire length of said belt and when the belt 80 is mounted on said rollers 126, 128 along a periphery 158 of said tube 76, said ridge 156 is inserted into said channels.

Figure 6:
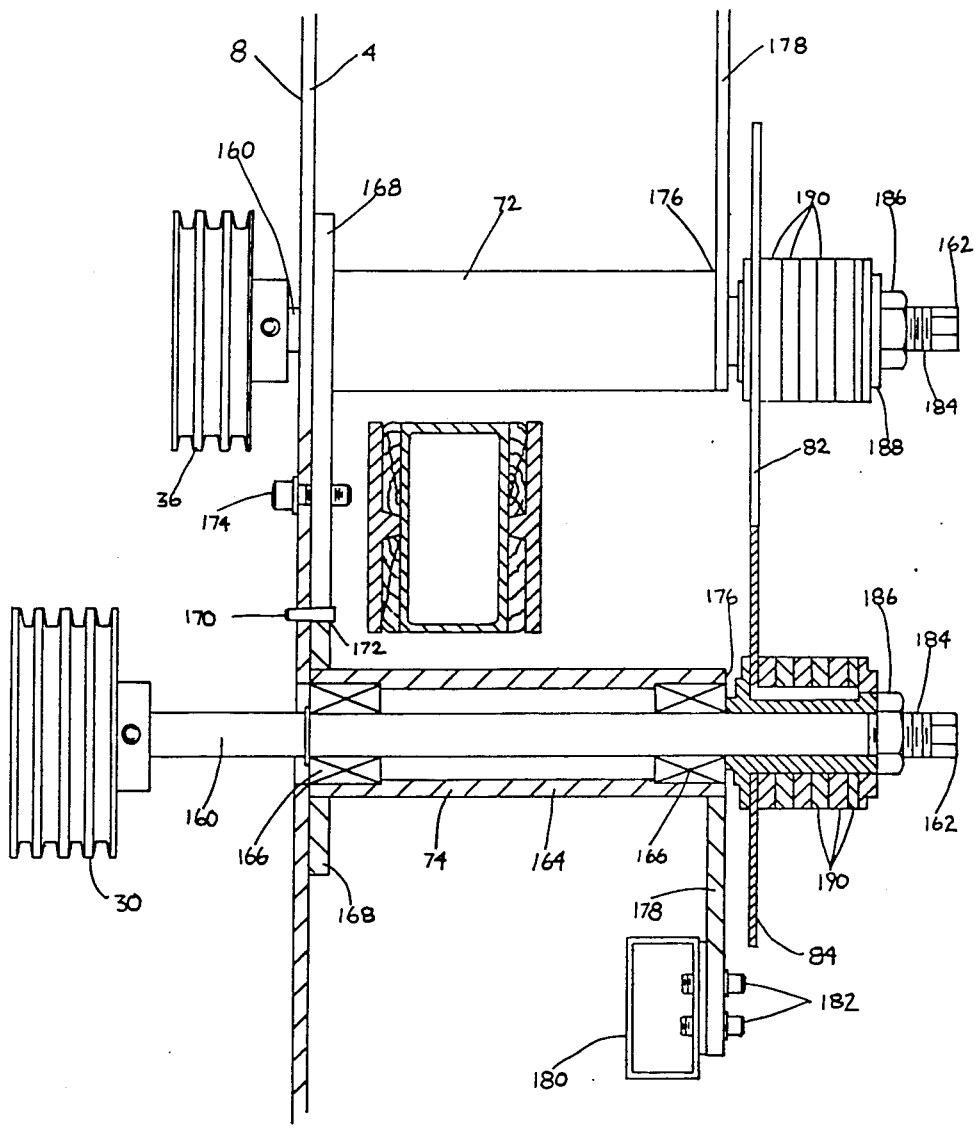
FIG. 6 is a rear view, partially in section, of the arbors.

Referring to FIG. 6 in greater detail, the lower rear arbor 74 is shown in cross-section and a rear view is shown of the upper front arbor 72. Since each of the arbors 72, 74 have many identical parts, except for the blades 82, 84, respectively, the identical parts of each arbor will be referred to by the same reference number. Each arbor 72, 74 has a shaft 160 that extends from the said side 8 of said housing 4 and abruptly terminates at a free end 162, just beyond an area where blades 82, 84 can be mounted. In FIG. 6, only one blade 82, 84 is mounted on each arbor 72, 74 respectively. In FIG. 3, six blades 82, 84 are shown to be mounted on each arbor 72, 74 respectively. Each shaft 160 is rotatably supported in an area between said blades 82, 84 and a side 8 of the housing 4 in a sleeve 164. At either end of each sleeve 164, roller bearings 166 rotatably support the shaft 160. Each sleeve 164 has an end nearest the side 8 that is welded to a base support plate 168. Since it is very important that the arbors 72, 74 can be positioned accurately within the resaw 2 and can be removed from said resaw and replaced in the identical position, a locating pin 170 is inserted into the side 8 of the housing 4 for insertion into a suitable opening 172 in the base support plate 168. If desired, more than one locating pin 170 can be used. The base support plate 168 is bolted to the side 8 of the housing 4 by bolts 174 (only one of which is shown in FIG. 6). An end 176 of each sleeve 164, located near the blades 82, 84 is supported by a second support plate 178. The support plate 178 of the lower arbor 74 is bolted to a lower part of a frame 180 by bolts 182. The second support plate 178 of the upper arbor 72 is bolted to an upper part of the frame 180 by bolts 182. This can best be seen in FIGS. 3 and 6. Also in FIG. 6, there is shown a part of the base support plate 168 for the upper arbor 72.

At an end of each shaft 160 opposite to the free end 162, there is mounted a pulley. The pulley 39 is mounted to the shaft 160 of the lower arbor 74 and the pulley 36 is mounted to the shaft 160 of the upper arbor 72. The shaft of the lower arbor is slightly longer than the shaft of the upper arbor to accommodate the chains 66 that extend between adjacent sprockets 62 of the spiked rollers 44.

The free end 162 of each shaft 160 has a machined thread 184 and a nut 186 threaded thereon. The nut 186 is tightened against washer 188 and blade spacers 190 to rigidly hold the blades 82, 84 on each arbor 72, 74 respectively. While only one blade is shown on each arbor in FIG. 6, further blades could be readily installed, up to a maximum of six on each arbor, and separated from adjacent blades by using the spacers 190. Where it is desired to increase or decrease the distance between adjacent blades, either larger or smaller spacers can be utilized, as desired. It can be seen that blades 82, 84 can readily be removed and replaced or further blades can be added simply by removing the nut 186 from each shaft 160. The arbors 72, 74 are located so that the blades 82, 84 are fully exposed when the cover 38 is removed from the housing 4. This permits the blades 82, 84 to be easily and quickly changed.

As shown in FIG. 1, there is a control box 18 mounted on a front 10 of the housing 4. All of the rollers 44, 86, 98, 126 and 128 of the resaw 2 can rotate in either direction. The rollers 44, 86, 128 all have the same size hydraulic motors 64, 96, 78, respectively, driving them and they are all connected to the same hydraulic power source (not shown). The connections between the hydraulic motors 64, 78, 96 as well as the hydraulic power source are conventional and have been omitted for ease of illustration. The motors are connected through the control box 18 in such a way that a button 192 operates as a reverse button. This will cause the belt 80, the side pressure rollers 86 and the spiked rollers 44 to rotate in a reverse direction (i.e. towards the entrance 14). The reverse button can be very useful if the wood being processed in the resaw becomes jammed.

The hydraulic power source is connected through the control box 18 to the hydraulic motors so that the speed of said motors can be varied over a suitable range. At any given point in time, the speed of all of the hydraulic motors 64, 78, 96 is identical and therefore the speed of rotation of the spiked rollers 44, the side pressure rollers 86 and the belt 80 is identical. Preferably, the range of speed of said rollers is from one foot per minute to one hundred and fifty feet per minute.

The control box is connected in a conventional manner and has therefore not been described in detail. Preferably, the control box has a warning light or warning lights 194 that glow when the amperage drawn by the electric motors exceeds a predetermined maximum so that said light or lights will glow when the blades become dull, wood being split is jammed in said arbors or bearings supporting said arbors become too worn. Of course, the control box also has a start and stop switch 196 for each of the motors as well as means 198 for varying the speed of the rollers.

In operation, the belt 80 can be mounted onto the adjustable fence 42 by adjusting the front roller 126 towards the rear. Once the belt 80 has been inserted around the periphery 158 of the tube 76, the front roller 126 can be adjusted forward by turning the threaded bolt 134 until such time as the belt 80 fits snugly on the rollers 126, 128.

When the desired number of blades 82, 84 have been suitably spaced on the arbors 72, 74 respectively, the electric motors 20, 22 can be started to drive the arbors 72, 74. The arbor 72 is located towards a front 10 of said housing 4 and cuts an upper portion of the wood being split. The arbor 74 is located towards a rear 12 of the housing 4 and cuts a lower portion of the wood being split. As can be seen from FIG. 6, the blades on the two arbors overlap slightly so that a complete cut is made by a blade on one arbor and a corresponding blade on the other arbor. The term "corresponding blade" means that a blade on one arbor lies entirely in the same plane as a blade in the other arbor. Each of said arbors rotates in a clockwise direction when viewed from the side 6 shown in FIG. 1. In other words, the upper arbor 72 turns in a direction that draws the wood into the resaw towards the exit 16. The arbor 74 turns in the same direction as the arbor 72 but because it is located beneath the level of the wood being split, it turns in such a manner as to exert a force on the wood towards the entrance 14.

The hydraulic motors can be activated either before, after or simultaneously with the electric motors. The speed of the hydraulic motors is set at a level that is comfortable to the operator depending on the type of wood that is being cut and other factors that may be peculiar to an operator. For example, if the pieces of wood being split are relatively short, the operator will probably want to operate at a lower speed than if the wood being split is relatively long.

Once the belt 80, the roller 86, the spiked rollers 44 and the arbors 72, 74 are operating in the direction as described, the wood to be split can be fed into the resaw, one piece at a time. One end of the first piece of wood being split is simply inserted partially between the first roller 86 and the belt 80. The spiked rollers 44, the side pressure rollers 86 and the belt 80 then draw that piece of wood into the resaw past the arbors 72, 74. The purpose of the top roller 98, is to prevent the last part of a piece of wood that passes through the arbors from lifting off the spiked rollers 44 prematurely. The top roller 98 is automatically adjustable for differences in the height for successive pieces of wood being split. The distance between the side pressure rollers 86 and the belt 80 is also automatically adjustable for differences in width of the wood being split. Also, the rotatable fence 42 itself can be moved laterally relative to the blades 82, 84 depending on the size of cut that is desired to be made. The resaw described in this embodiment has a housing constructed on a frame. It would be possible, though not very safe, to construct a resaw with only a frame as the housing. Safety shields over the sprockets 62 and the belts and pulleys on the side 8 of the housing have been purposely omitted for ease of illustration. Parts of the housing are removable for maintenance purposes and to facilitate the removal of sawdust.

It has been found that the resaw of the present invention can make multiple cuts with blades having a narrow kerf. Preferably, the gauge of kerf ranges from 125.00 to 134.00 utilizing 1-12 circular saws of 10" to 18" in diameter.

Numerous variations can be made to the resaw of the present invention within the scope of the attached claims. For example, more or fewer spiked rollers could be used. The mandrels could be designed to accept more than six blades. The arms on the side pressure rollers 86 could be increased in length to accept wood of greater width. Numerous other variations within the scope of the attached claims will be readily apparent to those skilled in the art.

The resaw of the present invention will cut wood into multiple sections to a specified thickness in a single pass through the resaw. Since the resaw will accept lumber varying in width and height in a continuing cutting process, there is no need to sort the lumber according to size before placing it in the resaw.

What I claim as my invention is:

1. A resaw for splitting wood comprising:
   (a) a housing having two sides, a front and a rear with an entrance for said wood being located at said front and an exit for said wood being located at said rear;
   (b) twin arbors located between said entrance and said exit, each arbor having at least one saw blade mounted thereon, one arbor being positioned so that its blade or blades cuts the lower portion of wood being split, the other arbor being positioned so that its blade or blades cuts the upper portion of wood being split, each blade on one arbor having a corresponding blade on the other arbor, the arbors being offset from one another from front to rear so that a cutting area of the two arbors overlaps slightly;
   (c) a workbed for said wood is located between said entrance and said exit, said workbed being formed from a series of elongated rollers, said rollers being rotatably mounted from side to side along said housing, adjacent rollers being spaced apart from one another from said entrance to said exit with a larger space being located between those rollers that are adjacent to a front and rear of said arbors, said rollers being rotatable in an appropriate direction to force wood being split towards said exit, said elongated rollers being connected to a suitable power source to cause said rollers to rotate;
   (d) an adjustable fence extending along said workbed and slightly beyond said entrance and said exit, said fence having a continuous belt mounted on a side adjacent to said blades, said belt being rotatable in an appropriate direction so that said belt can force wood being split towards said exit when the resaw is in use, said fence being adjustable towards or away from said arbors;
   (e) at least two side pressure rollers mounted in a spaced relationship to said adjustable fence on a side adjacent to said blades, said pressure rollers being automatically adjustable so that they can exert pressure towards said fence on any wood, within a predetermined size range, located between said rollers and said fence, said rollers being rotatable in an appropriate direction so that wood being split can be forced towards said exit when the resaw is in use; and
   (f) at least one power source to drive the arbors, the adjustable fence and the two side pressure rollers.

2. A resaw as claimed in claim 1 wherein the side pressure rollers are mounted so that when the location of said fence is adjusted, the location, at rest, of said pressure rollers in relation to said fence remains constant.

3. A resaw as claimed in claim 2 wherein both side pressure rollers are located between said entrance and said arbors.

4. A resaw as claimed in claim 3 wherein the elongated rollers are spiked or knirled.

5. A resaw as claimed in claim 4 wherein there is a top roller mounted adjacent to said adjustable fence near said exit, said top roller being mounted so that it forces any wood located between it and the workbed towards the workbed, said roller being rotatable by the wood coming into contact with it.

6. A resaw as claimed in claim 5 wherein the arbors have one to six saw blades mounted thereon, each arbor having a shaft that extends from the same side of said housing, each shaft abruptly terminating at a free end just beyond an area where said blades can be mounted, each shaft being rotatably supported only on that side of the blade or blades that extends from said housing.

7. A resaw as claimed in claim 6 wherein there are means for moving the adjustable fence laterally relative to said blades.

8. A resaw as claimed in claim 7 wherein the means to move the fence laterally is an arm extending along one side of said housing and being rotatably mounted to said housing, said are being connected by gears to two side arms that are rotatably mounted on said housing, one side arm being located in front of said arbors and one side arm being located to the rear of said arbors, each side arm having a threaded end that is connected to a bracket affixed to a stationary part of said fence, each bracket having a threaded opening for receiving one side arm, said fence moving back and forth as said arm is rotated in either direction.

9. A resaw as claimed in claim 8 wherein the arm has a handle mounted thereon as well as locking means to fix the arm in one position, when desired.

10. A resaw as claimed in claim 5 wherein there is an hydraulic power source driving the belt on the adjustable fence, the side pressure rollers and the spiked rollers and a separate power source driving said arbors.

11. A resaw as claimed in claim 10 wherein the arbors are driven by an electric motor and the movable fence, side pressure rollers and spiked rollers are driven by an hydraulic power source.

12. A resaw as claimed in claim 9 wherein each arbor is driven by a separate electric motor and the rotatable fence has one hydraulic motor, the two side pressure rollers each have one hydraulic motor and the spiked rollers together have one hydraulic motor, the four hydraulic motors all being driven at the same speed by one hydraulic power source.

13. A resaw as claimed in claim 11 wherein the belt of the adjustable fence, side pressure rollers and spiked rollers are rotatable in either direction and the hydraulic power source is connected to a control box in such a manner that it can be operated in reverse so that the belt of the adjustable fence, side pressure rollers and spiked rollers can be driven in a reverse direction.

14. A resaw as claimed in claim 11 wherein the hydraulic power source is designed so that the belt of the adjustable fence, side pressure rollers and spiked rollers all rotate at the same speed.

15. A resaw as claimed in claim 11 wherein the hydraulic power source is connected to a control box in such a manner that the speed of the hydraulic motors can be varied in a range from 1' per minute to 150' per minute, the speed of all of the hydraulic motors being identical with one another at any given point in time.

16. A resaw as claimed in claim 13 wherein the control box has a warning light or warning lights that are connected to glow when the amperage drawn by the electric motors exceeds a predetermined maximum, said light or lights glowing when the blades become dull, wood being split is jammed in said arbors or bearings supporting said arbors become too worn.

17. A resaw as claimed in claim 12 wherein each of the spiked rollers has one or two sprockets, as required, so that chains can be connected between said hydraulic motor that drives said spiked rollers and one of said spiked rollers and also between adjacent spiked rollers so that said spiked rollers are driven together by one hydraulic motor.

18. A resaw as claimed in claim 5 wherein the arbor located towards a front of said housing cuts an upper portion of the wood being split and the arbor located towards a rear of said housing cuts a lower portion of the wood being split, said arbors each rotating in a clockwise direction when viewed from a side of said frame opposite to the side on which said arbors are supported.

19. A resaw as claimed in claim 5 wherein the adjustable fence has a stationary part that is an elongated frame having a rectangular cross-section, said frame extending from an area of said entrance to an area of said exit, a front roller being mounted at an end of said frame near said entrance and a rear roller being mounted at an end of said frame near said exit, one of said front and rear rollers being adjustable longitudinally relative to said frame, with a belt being mounted along a periphery of said frame and said front and rear rollers, one of said front and rear rollers being connected to an hydraulic motor.

20. A resaw as claimed in claim 19 wherein the rear roller is driven by an hydraulic motor and the front roller is adjustable longitudinally.

21. A resaw as claimed in claim 19 wherein there are two wear strips affixed to each side of said frame, each pair of wear strips defining a U-shaped channel near a centre line of each side of said frame, said channel extending along each side of said frame from front to rear, with a channel of similar shape being located in a circumference of each of the front and rear rollers, all channels being aligned with one another, said continuous belt having a ridge extending along its interior surface, said ridge corresponding in size, shape and location to said channels so that when the belt is mounted on said rollers along the periphery of said frame, said ridge is inserted into said channels.

22. A resaw as claimed in claim 19 wherein the side pressure rollers are each mounted to an upper surface of said frame of said adjustable fence by means of swingable arms that are pivoted on the frame of said fence, each of said side pressure rollers being rotatable about said pivot point and having means forcing each roller towards, but not in contact with said fence.

23. A resaw as claimed in claim 22 wherein the means for forcing each side pressure roller towards but not in contact with said movable fence is an air cylinder mounted on each side pressure roller between a swingable part of said arm and said frame, said air cylinder allowing said arm to pivot relative to said adjustable fence while exerting pressure on said arm to force said roller towards, but not in contact with, said fence.

24. A resaw as claimed in claim 19 wherein the top roller is rotatable in either direction, said top roller being positioned normal to said side pressure roller said top roller being movable either towards or further from said workbed, with means to force said top roller towards, but not in contact with said workbed.

25. A resaw as claimed in claim 24 wherein the top roller has two straps that extend from either end of a centre axis of said roller and are pivotally connected to a bracket by a rod, said bracket being affixed to said tube, said top roller being rotatable about said rod so that said top roller can move towards or further from said workbed, a pin extending from said rod, with a spring extending between a free end of said pin and said tube, said spring exerting a downward pressure on said top roller toward said workbed.

26. A resaw as claimed in claim 12 wherein each electric motor has a pulley located at one end and each arbor has a pulley located at one end of the shaft with belts connecting the two pulleys of one electric motor and the arbor being driven by that electric motor.

27. A resaw as claimed in claim 26 wherein the shaft of each arbor is rotatably supported by roller bearings within a cylindrical sleeve extending between said blades and a side of said housing, said sleeve being rigidly supported at each end.

* * * * *